United States Patent [19]

Jason et al.

[11] Patent Number: 5,540,927
[45] Date of Patent: Jul. 30, 1996

[54] MICROENCAPSULATION PROCESS BY COACERVATION

[75] Inventors: Mark E. Jason, Chesterfield; Dennis J. Kalota, Fenton, both of Mo.

[73] Assignee: Monsanto Company, St. Louis, Mo.

[21] Appl. No.: 420,463

[22] Filed: Apr. 12, 1995

[51] Int. Cl.⁶ .................................................. A01M 25/08
[52] U.S. Cl. .................................... 424/408; 424/456
[58] Field of Search ...................................... 424/408, 456

[56] References Cited

U.S. PATENT DOCUMENTS

| | | | |
|---|---|---|---|
| 2,800,457 | 7/1957 | Green et al. | 424/486 |
| 4,391,909 | 7/1983 | Lim | 435/178 |
| 4,803,168 | 2/1989 | Jarvis, Jr. | 435/178 |
| 4,976,962 | 12/1990 | Bichon et al. | 424/486 |
| 4,990,336 | 2/1991 | Silvestri et al. | 424/486 |
| 5,126,147 | 6/1992 | Silvestri et al. | 424/422 |
| 5,175,285 | 12/1992 | Lehmann et al. | 544/141 |

OTHER PUBLICATIONS

Kirk–Othmer Encyclopedia of Chemical Technology, 4th ed, 12 pp. 406–416.
Kirk–Othmer Encyclopedia of Chemical Technology, 3rd Ed, vol. 15, pp. 470–493.
Nolf, *Chemical Abstracts*, vol. 106, 1987, #31368.
Chen et al., *Chemical Abstracts*, vol. 108, 1988, #11179.
Cummings et al., *Chemical Abstracts*, vol. 115, 1991, #35629.

*Primary Examiner*—Thurman K. Page
*Assistant Examiner*—S. Howard
*Attorney, Agent, or Firm*—R. C. Loyer

[57] ABSTRACT

There is disclosed a process for microencapsulation of materials by means of complex coacervation employeing gelatin and polyaspartic acid. Material to be encapsulated is emulsified in an aqueous solution of gelatin. Polyaspartic acid or a salt thereof is employed to provide a counter ion to the gelatin which, when induced to precipitate from solution by cooling and/or pH change forms a wall around the material. The wall is hardened by crosslinking to form a stable microcapsule containing the material.

23 Claims, 2 Drawing Sheets

MICROENCAPSULATION PROCESS BY COACERVATION

This application relates to a process for microencapsulation of various materials and more particularly to such encapsulation by means of coacervation techniques.

Various types of microencapsulation employ polyamino acids in conjunction with other polymers to form or aid in forming microcapsules. Examples are shown in U.S. Pat. Nos. 4,990,336 and 5,126,147 to Silvestri, et al. which provide biodegradable microcapsules for sustained release medications. Polypeptides are formed from esterified polyamino acids to form polymers which, upon precipitation form microspheres containing diverse biological agents.

Polyamino acids have also been employed to provide surface coatings for medicinal purposes and foods for ingestion by animals and humans. Typically polysuccinimide or derivatives thereof are dissolved in a suitable solvent and the material to be coated is contacted with the solution of the polymer and dried. Examples of this type of operation are found in U.S. Pat. No. 5,175,285 to Lehmann, et al. Gelatin and agar are traditionally employed to provide temporary capsules. Such materials possess various attributes which militate against their use as the permanent encapsulating material. Among the unfavorable attributes is the tendency of gelatin to decay over relatively brief periods of time thereby providing a detectable odor of ammonia in it surroundings. Such odor is offensive and therefore not conducive to practical utility. In some instances the gelatin capsule is employed as an intermediate step in the formation of semipermeable microencapsulation in accordance with U.S. Pat. No. 4,391,909 to Lim. Another example of a coacervation involving gelatin and Gum Arabic is found in U.S. Pat. No. 3,800,457 to Green et al.

Polypeptides are capable of being tailored by forming copolymers. Esterified polyaspartic and polyglutamic acids are taught as microencapsulation polymers which are also modified by the type of ester group to control degradation. Such controlled degradation is especially useful in providing drug treatment. Microcapsules of this type comprise a polymeric membrane and contain an aqueous or oily solution in which the drug is suspended or dissolved. The drug is progressively released as a result of biodegradation of the polypeptide polymer.

Semipermeable membranes are disclosed in U.S. Pat. No. 4,803,168 to Jarvis wherein viable cell-containing microcapsules are formed from polyanionic polymers such as polyaspartic acid or polyglutamic acid and chitosan. These microcapsules are comprised of an inner layer comprising chitosan and an outer layer comprising the polyanionic polymer. These layers become cross-linked between the cationic amine groups on the chitosan and the anionic groups on the polyanionic polymer to form a water-insoluble permanent capsule. Such microcapsules are capable of retaining in their interior viable cells which can grow and reproduce.

A commercially important method of microencapsulation was developed by National Cash Register Company employing complex coacervation. Complex coacervation has been employed to provide capsules for use in controlled dry delivery, fragrance samplers, pesticides and cosmetic ingredients. A large commercial market has been created for microencapsulation in the application "carbonless" copy paper systems. Such systems remain the largest practical application of products of microencapsulation. In the complex coacervation process gelatin having a high iso-electric point and gum arabic containing many carboxyl groups are added to a core-containing suspension at relatively low pH above 35° C. The gelatin and gum Arabic react to form microdroplets of polymer coacervate which separate. The wall around the core is hardened by several means such as by the addition of formaldehyde or glutaraldehyde. In the final steps, the suspension of microcapsules is cooled and the pH raised after which the suspension is filtered leaving the microcapsules on the filter media. Many variations of complex coacervation are known as well as combinations of polymers. Complex coacervation is employed to encapsulate solids and liquids. Further explanation of complex coacervation techniques is discussed in the Encyclopedia of Chemical Technology, Third Edition, Vol. 15, pp. 470–493, published by John Wiley & Sons, N.Y., N.Y, which is hereby incorporated by reference.

Gum Arabic is also known as Acacia, a plant exudate. It is an imported material with respect to the United States and while generally available it is desirable that the large commercial market involving such an inexpensive coacervate as gelatin be independent of imported materials at relatively low cost. Non-permeable membrane microencapsulation is performed in great volume with gelatin and Gum Arabic. A replacement for Gum Arabic at reasonable cost would enable this large commercial market to operate at greater efficiency by obviating the need to provide an adequate supply of the imported Gum Arabic on hand in the event of importation difficulties. Complete microencapsulation of all active material in an inexpensive gel microcapsule which is more stable than currently available would widen markets for such microencapsulation processes generally.

In the art of microencapsulation, the problems encountered involve the production of microcapsules in which only a certain percentage of those formed successfully encapsulate a liquid core without leaking. The production of a percentage of microcapsules that leak reduces efficiency and wastes product. As noted above, while gelatin is an available material for microencapsulation, it is given to degradation with concomitant odor of ammonia being exuded. While gelatin is relatively inexpensive such problems have limited its use in microencapsulation to preparing temporary microcapsules. There is needed a microencapsulation process which could utilize microencapsulation gelatin to prepare permanent microcapsules with high efficiency. One of the most practical ways to increase efficiency of any microencapsulation process is to produce a high percentage of non-leaking microcapsules.

SUMMARY OF THE INVENTION

There has now been discovered a microencapsulation process which employs gelatin and polyaspartic acid as coacervates which provides highly advantageous non-permeable microcapsules. Surprisingly, the microcapsules prepared by the process of this invention are uniformly spherical and the novel process substantially completely microencapsulates all actives employed in the process. Also surprisingly, there is provided in accordance with this invention the substantial elimination of microcapsules which allow active material to escape prematurely.

In accordance with this invention gelatin is employed in a complex coacervation process to encapsulate any number of active materials wherein polyaspatic acid or salt thereof is provided as the second marcomolecule (anionic agent) which allows the gelatin to form around the active agent being encapsulated. The capsule walls are then cross linked by typical prior art means such as reaction with an aldehyde, commonly glutaraldehyde. It has been found that stable, non-leaking spherical microcapsules are obtained which are of substantially uniform microencapsulation.

DETAILED DESCRIPTION OF THE INVENTION

Figure 1:
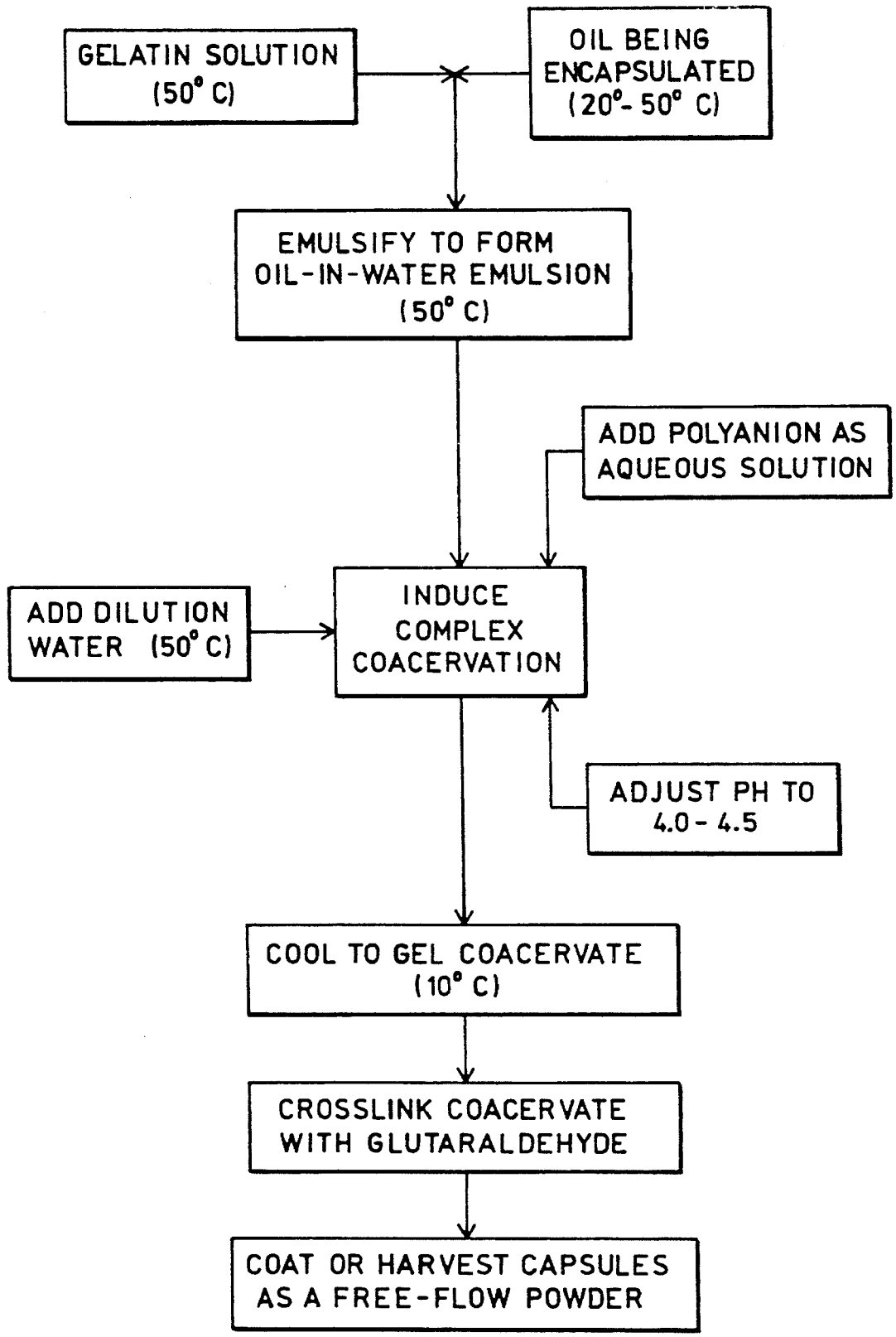
FIG. 1 is a flow diagram of typical complex coacervation process for microencapsulation.

A typical flow diagram for complex coacervation as shown in FIG. 1 generally describes the process of this invention. In FIG. 1 the polyanion shown in the complex coacervation step is, in accordance with this invention, polyaspartic acid or a salt thereof. Typically an alkali metal salt of polyaspartic acid or the acid itself is employed. The polyaspartic acid or salt thereof is typically obtained by means of thermal condensation of aspartic acid, preferably l-aspartic acid.

Because of the various impending potential utilities of polyaspartic acid, interest in processes for preparing such compounds in large volume, particularly polyaspartic acid, has increased. This interest has resulted in several recent patents being issued which are directed to fluid bed systems; in particular, U.S. Pat. No. 5,219,986 to Cassata. Other such patents are U.S. Pat. Nos. 5,057,597 and 5,221,733 to Koskan and Koskan et al. respectively. More recently, patents have issued covering a process for preparing the polysuccinimide by means of tray driers such as a rotary tray drier in U.S. Pat. Nos. 5,329,020 to Kalota et al. and 5,319,145 to Paik et al. and an indirectly heated tray drier in U.S. Pat. No. 5,315,010 to Koskan et al. Any suitable process for the production of polyaspartic acid provides the coacervate of this invention. Polyaspartic acids of various molecular weights can be employed in the process of this invention. Most processes provide polyaspartic acid polymers having molecular weights in the range of from about 5,000 to about 12,000. However, higher molecular weight polymers may be employed ranging up to 20,000, without exceptional modification of the process. Any water soluble polyaspartic acid is useful in the process of this invention.

Gelatin of many types and grades can be employed to encapsulate active material in accordance with this invention. Typical gelatins include Type A of from 100 to about 300 Bloom as well as Type G gelatin (ossein) typically of from about 200 to about 300 Bloom. Gelatin is described in The Encyclopedia of Chemical Technology referred to above at Vol. 12, pp. 406–416 which is hereby incorporated by reference.

Any number of active materials which can be suitably suspended or emulsified in an emulsion can be employed in the process of this invention. Typical active materials are listed in the Encyclopedia of Chemical Technology, Vol. 12 and Vol. 15 noted above. Any water insoluble liquid or solid which can be emulsified in an aqueous solution of gelatin at convenient temperatures such as in the range of from about 45° C. to about 60° C. may be encapsulated in accordance with this invention. In summary, such active material include dyes or dye intermediates for carbonless copy paper, usually crystal violet, food products, photographic materials, flavors and essences, pesticides and herbicides, adhesives, visual indicators and pharmaceuticals.

Referring again to FIG. 1, the process of this invention involves in the first steps, the dissolving of gelatin in a suitable solvent, usually water. The gelatin solution is then combined with the active material which, in FIG. 1, is described as an oil. An oil-in-water emulsion is formed with agitation and the temperature is held mildly elevated in the range of about 50° C. When thoroughly emulsified, polyaspartic acid or salt thereof is added which provides ions of opposite electric charge than the gelatin. In the presence of the polyaspartic acid the emulsion is then subjected to conditions whereby complex coacervation of the gelatin occurs. This may be done by addition of an acid to adjust the pH of the emulsion or by adding sufficient water or both. Because the viscosity of the emulsion increases at this point additional water is usually added to maintain fluidity and ease of agitation. Also, the pH is adjusted to the range of from about 4.0 to about 4.5 with a weak acid such as glacial acetic acid. At this point in the process the gelatin forms microcapsules and provides walls around the material to be encapsulated. After reduction of the pH, the emulsion is cooled to a temperature in the range of from 5° C. to about 15° C. thereby causing the gelatin to gel or solidify into microcapules. Once microcapules are produced, they are hardened to provide a durable particle. To harden the gelatin microcapsules a crosslinking agent is introduced into the emulsion which reacts with the gelatin. Typically the crosslinking agent is an aldehyde or inorganic salt. Typically the aldehyde crosslinking agent is formaldehyde and preferably glutaraldehyde. Typical inorganic salts are poylphosphates. The hardened microcapsules are then removed from the emulsion by typical means such as filtration.

In accordance with this invention a wide range of microcapsules can be produced depending upon the condition employed in the process. Microcapsules having a small microencapsulation such as less than 20 microns are highly useful in the carbonless copy paper systems. However, microcapsules in the range of from 100 to 400 microns are provided in accordance with this invention.

The above disclosure generally describes the invention. A more complete understanding can be obtained by reference to the following specific examples which are provided herein for the purposes of illustration only and are not to limit the scope of the invention. In the following examples, percent means percent by weight unless otherwise indicated.

DESCRIPTION OF THE PREFERRED EMBODIMENTS

EXAMPLE 1

Into a 600 ml beaker equipped with a stirrer is placed 120 ml of an 8.33% aqueous solution of 200 Bloom Type A Gelatin at 50° C. together with 3 to 4 drops of n-octanol as a foam suppressant. Then 80 ml of dibutylphthalate was mixed into the aqueous solution with agitation to form oil phase droplets in the range of 50–150 microns. With the emulsion pH at 4.91, 10 ml of a 28% solution of sodium polyaspartate (Avg. Mol. Wt. 9200) diluted with an addition 40 ml of water was added to the emulsion. Also an additional 170 ml of distilled water was added. The pH of the mixture was then lowered to 4.4 by addition of glacial acetic acid. The mixture was cooled to about 10° C. in a ice bath and the pH lowered to 4.22. After 45 minutes at 10° C., 5 ml of 25% glutaraldehyde was added and the mixture allowed to stand overnight at 22° C. The microcapsules were then separated from the mixture and dried with the aid of fumed silica. A free flowing powder was obtained which was analyzed for size by sieve analysis as indicated below in Table I

TABLE I

| Microencapsulation - Microns | Amount - grams |
| --- | --- |
| >600 | 58.3 |
| 300–600 | 9.09 |
| 177–300 | 3.28 |
| 106–177 | 2.47 |
| <106 | 8.46 |

A second yield of microcapsules was obtained upon further settling of the mixture providing about 12.4 g of greater than 300 micron microcapsules.

EXAMPLE II

Figure 2:
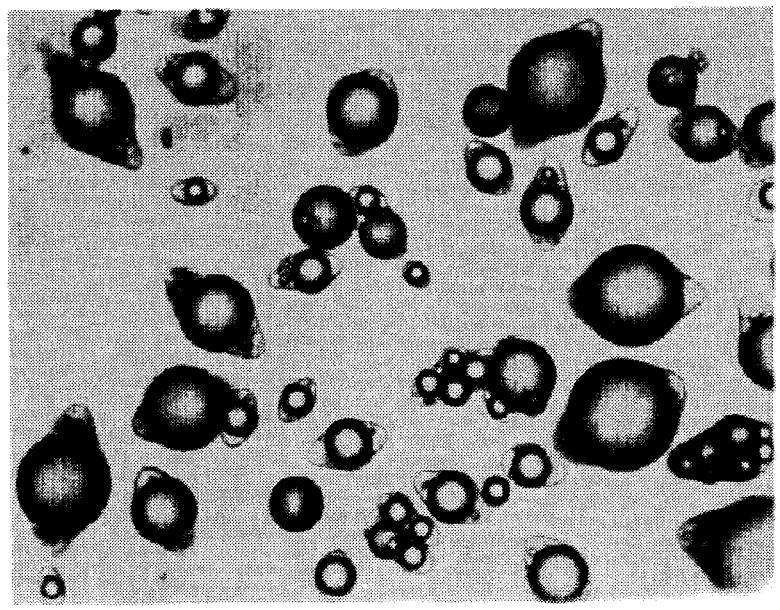
FIGS. 2 and 3 are photo micrographs of typical microcapsules produced in the process of this invention.

The procedure of Example I was repeated except that 15 ml of sodium polyaspartate diluted to 50 ml with water was added and 180 ml of additional water was added to the emulsion. A photo micrograph at 100× magnification of a portion of these microcapsules appears in FIG. 2.

EXAMPLE III

As a comparison, the procedure of Example I was repeated with the exception that 110 ml of water and 20 ml of a 5% solution of a sodium polymetaphosphate (Graham's salt) sold under the trade name "Calgon" was substituted in place of the sodium polyaspartate. The product was passed through a course sieve on which 36.9 g of microcapsules was retained and 58.8 g of microcapsules passed through. A sieve analysis of the microcapsules which passed through the course screen was further sieve analyzed and the results appear in Table II below.

TABLE II

| Microencapsulation - Microns | Amount - grams |
| --- | --- |
| >600 | 1.60 |
| 300–600 | 9.15 |
| 177–300 | 7.10 |
| 106–177 | 19.45 |
| <106 | 16.30 |

Figure 3:
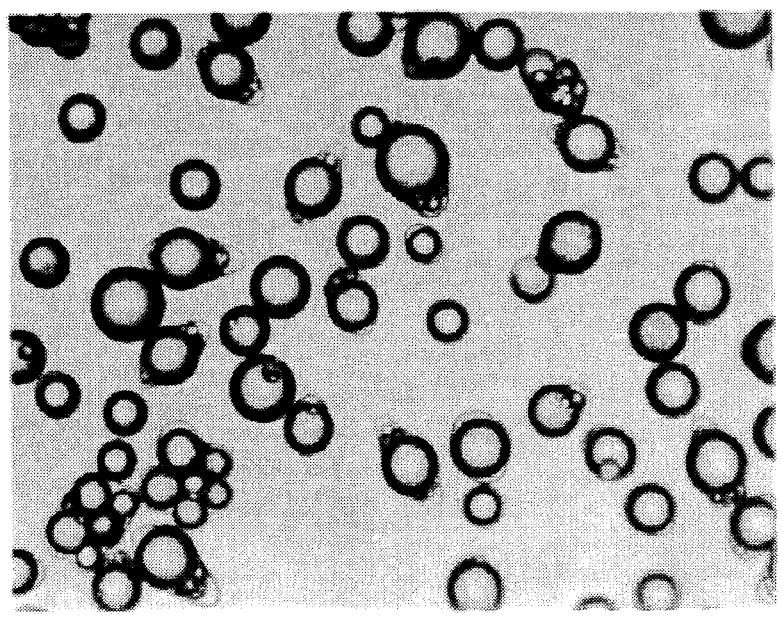

As indicated by the above data, this procedure produced widely varying sizes of microcapsules. A photomicrograph of a portion of these microcapsules at 100× magnification appears in FIG. 3.

EXAMPLE IV

The procedure of Example I was repeated with the exception that the emulsion droplets were in the range of from 5–10 microns and the crosslinking step was allowed to procede for 24 hrs at 8.4° C. A dry powder comprising microcapsules was obtained which was sieve for particle size as shown in Table III below.

TABLE III

| Microencapsulation - Microns | Amount - grams |
| --- | --- |
| >850 | 54.78 |
| 600–850 | 9.95 |
| 425–600 | 8.24 |

TABLE III-continued

| Microencapsulation - Microns | Amount - grams |
| --- | --- |
| 250–425 | 6.40 |
| 106–250 | 5.15 |
| <106 | 8.36 |

The above results indicates a larger number of smaller microcapsules than obtain by the procedure of Example I.

EXAMPLE V

A series of runs were made employing 120 ml of 8.33% aqueous solution of 160 Bloom Type A Gelatin. No foam suppressant was employed in these runs. The general procedure of Example I was repeated in each run except that in Example VA, 80 ml of Rose Oil was emulsified, in Example VB, Lilac Oil was emulsified and in Example VC Balsam Fir Oil was emulsified. In each run 10 ml of a 28% aqueous solution of sodium polyaspartate (Avg. Mol. Wt. 9200) diluted in 40 ml of water was added together with 170 ml of additional distilled water. The pH of the emulsion was lowered to about 4.4 with glacial acetic acid and the temperature of the emulsion held at about 48° C. to 49° C. The acidified emulsion was then cooled to a range of from 9.5° C. to about 10° C. overnight in an ice bath. About 30 minutes after the emulsion reached the reduced temperature range, the microcapsules were crosslinked by introducing 5 ml of 25% glutaraldehyde. The crosslinking reaction proceeded for 24 hrs. at room temperature to provide, after filtration, a dry powder of microcapsules. None of the microcapsules in each run leaked as evidenced by the lack of any odor from the encapsulated oils.

EXAMPLE VI

Into a 600 ml beaker there was introduced 120 ml of an 8.33% aqueous solution of 250 Bloom Limed Ossein Gelatin at 50° C. With agitation there was added to the gelatin 80 ml of sebacic acid dibutyl ester. The emulsion had a pH of 5.75 at 48.4° C. To the emulsion was added 10 ml of a 28% solution of sodium aspartate (Avg. Mol. Wt. 9200) in 40 ml of water. An additional 170 ml of distilled water was then added to the emulsion and the pH adjusted to 4.4 with glacial acetic acid, while holding the temperature at about 48.1° C. To provide free coacervate, an additional 240 ml of distilled water was added with a resultant pH of 4.25 at 50.5° C. The emulsion was cooled in an ice bath over a period of nearly 24 hours and 30 minutes after cooling to 10° C. the microcapsules were crosslinked by adding 5 ml of glutaraldehyde to the emulsion. Crosslinking reaction proceeded for 24 hrs. at room temperature. After separation and drying, a free flowing powder of microcapsules was produced.

EXAMPLE VII

Duplicate runs were made to microencapsulate a herbicide. The general procedure of Example I was followed in each case except that in Example VIIB, 231 Bloom Type A Gelatin was employed. In each run 30 g of a commerically prepared herbicide sold under the trade name Triallate Tech. by Monsanto Company, St. Louis, Mo. was emulsified in the gelatin solution. In Example VIIA 140 ml of water was added to the emulsion in the coacervation step while in Example VIIB 180 ml of water was added. After cross linking with gluteraldeyde, the microcapsules were dried.

The microcapsules were analyzed for particle size and the results appear in Table IV below.

TABLE IV

| Microencapsulation - | Amount - grams | |
| --- | --- | --- |
| Microns | Example A | Example B |
| >850 | 11.98 | 16.62 |
| 600–850 | 1.58 | 2.72 |
| 425–600 | 2.32 | 2.65 |
| 250–425 | 1.45 | 1.45 |
| <250 | 4.87 | 4.19 |

EXAMPLE VIII

The procedure of Example I was repeated with the exception that 231 Bloom Type A Gelatin was employed in place of 200 Bloom Type A Gelatin and only 30 ml of dibutylphthalate was employed in place of 80 ml. Sieve analysis of the dried microcapsules appears in Table V below.

TABLE V

| Microencapsulation - Microns | Amount - grams |
| --- | --- |
| >850 | 34.21 |
| 600–850 | 5.63 |
| 425–600 | 5.36 |
| 250–425 | 4.41 |
| 106–250 | 10.26 |
| <106 | 0.92 |

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for microencapsulation of material which comprises
   (a) emulsifying said material in an aqueous solution of gelatin;
   (b) introducing polyaspartic acid into said emulsion;
   (c) subjecting the emulsion to conditions whereby complex coacervation of the gelatin occurs;
   (d) cooling the coacervate so as to gel the coacervate;
   (e) hardening the gel to provide a stable microcapsules, and;
   (f) recovering the microcapules.

2. The process of claim 1 wherein complex coacervation is induced by the addition of water to the emulsion.

3. The process of claim 1 wherein the complex coacervation is induced by the adjustment of the pH of the emulsion.

4. The process of claim 1 wherein complex coacervation is induced by the combination of the addition of water and the adjustment of pH.

5. The process of claim 4 wherein the adjustment of pH is accomplished by the addition of a weak acid to the emulsion.

6. The process of claim 5 wherein the acid is acetic acid.

7. The process of claim 1 wherein the emulsion is cooled to a temperature in the range of from 5° C. to about 15° C.

8. The process of claim 1 wherein the gel is hardened by means of crosslinking the gelatin with a crosslinking agent.

9. The process of claim 8 wherein the crosslinking agent is selected from the group consisting of an aldehyde and an inorganic salt.

10. The process of claim 9 wherein the crosslinking agent is an aldehyde.

11. The process of claim 10 wherein the aldehyde is glutaraldehyde.

12. The process of claim 1 wherein the polyaspartic acid has an average molecular weight in the range of from about 5000 to about 12,000.

13. The process of claim 1 wherein the polyaspartic acid has a molecular weight of up to about 20,000.

14. A process for the microencapsulation of an oil of essence which comprises
   (a) emulsifying the oil of essence in an aqueous solution of gelatin;
   (b) introducing polyaspartic acid into said emulsion;
   (c) adjusting the pH of and adding water to the emulsion whereby complex coacervation of the gelatin occurs;
   (d) cooling the coacervate to a temperature in the range of from about 5° to 10° C.;
   (e) hardening the gel to provide a stable microcapsule containing the oil of essence by means of crosslinking the gel with an aldehyde; and,
   (f) recovering the hardened microcapsules.

15. The process of claim 14 wherein the oil of essence is selected from the group consisting of balsam fir oil, rose oil and lilac oil.

16. The microcapsule containing the oil of essence produced by the process of claim 15.

17. A process for the microencapsulation of a herbicide which comprises
   (a) emulsifying the herbicide in an aqueous solution of gelatin;
   (b) introducing polyaspartic acid into said emulsion;
   (c) adjusting the pH of and adding water to the emulsion whereby complex coacervation of the gelatin occurs;
   (d) cooling the coacervate to a temperature in the range of from about 5° to 10° C.;
   (e) hardening the gel to provide a stable microcapsule containing the herbicide by means of crosslinking the gel with an aldehyde; and,
   (f) recovering the hardened microcapsules.

18. The process of claim 1 wherein the gelatin has a Bloom in the range of from about 100 to about 300.

19. The process of claim 15 wherein the gelatin Bloom is about 200.

20. The process of claim 17 wherein the gelatin Bloom is about 200.

21. The microcapsule containing a herbicide produced by the process of claim 17.

22. The microcapsule containing an encapsulated material produced by the process of claim 1.

23. The process of claim 15 wherein the aldehyde is glutaraldehyde.

* * * * *